United States Patent [19]

Abe

[11] Patent Number: 4,931,983

[45] Date of Patent: Jun. 5, 1990

[54] DATA PROCESSOR CAPABLE OF ACCESSING THE CONTENT OF INTERNAL COUNTERS AT A HIGH SPEED

[75] Inventor: Mitsue Abe, Tokyo, Japan

[73] Assignee: NEC Corporation, Tokyo, Japan

[21] Appl. No.: 145,079

[22] Filed: Jan. 19, 1988

[30] Foreign Application Priority Data

Jan. 16, 1987 [JP] Japan .................................. 62-7577

[51] Int. Cl.⁵ .............................................. G06F 9/00
[52] U.S. Cl. .................................. 364/900; 364/933; 364/933.2
[58] Field of Search ................................ 364/200, 900

[56] References Cited

U.S. PATENT DOCUMENTS

4,327,411  4/1982  Turner ................................. 364/900
4,516,218  5/1985  Hamilton ............................ 364/900

Primary Examiner—Gareth D. Shaw
Assistant Examiner—John G. Mills
Attorney, Agent, or Firm—Foley & Lardner, Schwartz, Jeffery, Schwaab, Mack, Blumenthal & Evans

[57] ABSTRACT

A data processor comprises a memory for storing programs and various data, an execution unit coupled to the memory to execute processing based upon the programs stored in the memory, a plurality of count registers carrying out a count operation at a predetermined interval, respectively and accessible by the execution unit, and a corresponding number of memory registers for temporarily storing a content of the corresponding count register, respectively. Further, a control circuit is provided for each of the memory registers to respond to a store instruction signal to the memory and a memory control signal from the execution unit for controlling an operation of the memory register storing the content of the count register.

12 Claims, 9 Drawing Sheets

DATA PROCESSOR CAPABLE OF ACCESSING THE CONTENT OF INTERNAL COUNTERS AT A HIGH SPEED

BACKGROUND OF THE INVENTION

1. Field of the Invention

The present invention relates to data processors having therein a plurality of counters controlled on a time division basis, and more specifically to data processors having therein a plurality of counter functions realized by a corresponding number of registers and controlled on a time division basis, which processors are capable of reading out a content of the registers with a high instruction execution efficiency.

2. Description of Related Art

Heretofore, in most of data processors having a plurality of counters therein, the plurality of counters are operated on a time division basis in order to save the number of necessary circuit elements, i.e., to elevate the use efficiency of circuits. More specifically, the counters are generally composed of a corresponding number of count registers associated with a common incrementer for sequentially incrementing the count registers one by one. Therefore, each of the respective count registers is accessible only at a predetermined time slot in which the content of the counter is incremented, i.e., at predetermined intervals. As a result, when the data processor wishes to read the content of any count registers, the data processor has to wait the reading of the count register until the time slot allotted to the count register to which the data processor wishes to access. This will decrease the instruction execution efficiency. In addition, the larger the number of the counters becomes, the larger the decrease of the instruction execution efficiency will become.

SUMMARY OF THE INVENTION

Accordingly, it is an object of the present invention to provide a data processor which has overcome the above mentioned defect of the conventional one.

Another object of the present invention is to provide a data processor having a plurality of counter functions realized by a corresponding number of registers and controlled on a time division basis, which processor is capable of reading out a content of the registers without lowering an instruction execution efficiency.

A further object of the present invention is to provide such a data processor which is capable of reading out a content of the registers with a high instruction execution efficiency, only with a small number of additional circuit elements.

The above and other objects of the present invention are achieved in accordance with the present invention by a data processor comprising memory means for storing programs and various data, execution means coupled to the memory means to execute processing based upon the programs stored in the memory means, a plurality of counter means carrying out a count operation at a predetermined interval, respectively and accessible by the execution means, a corresponding number of memory register means for temporarily storing a content of the corresponding counter means, respectively, and control means in response to a store instructional signal to the memory means and a memory control signal from the execution means for controlling an operation of the memory register means storing the content of the counter means.

With the above arrangement, the memory register means are controlled by the control means so as to function not only as an inherent temporary memory function but also as a buffer for the associated counter means. Accordingly, if the memory register means functions as the buffer for the associated counter means, the data equivalent to the content of the counter means can be read out by accessing the memory register means, not the counter means itself.

The above and other objects, features and advantages of the present invention will be apparent from the following description of a preferred embodiment of the invention with reference to the accompanying drawings.

DESCRIPTION OF THE PREFERRED EMBODIMENT

Figure 1:
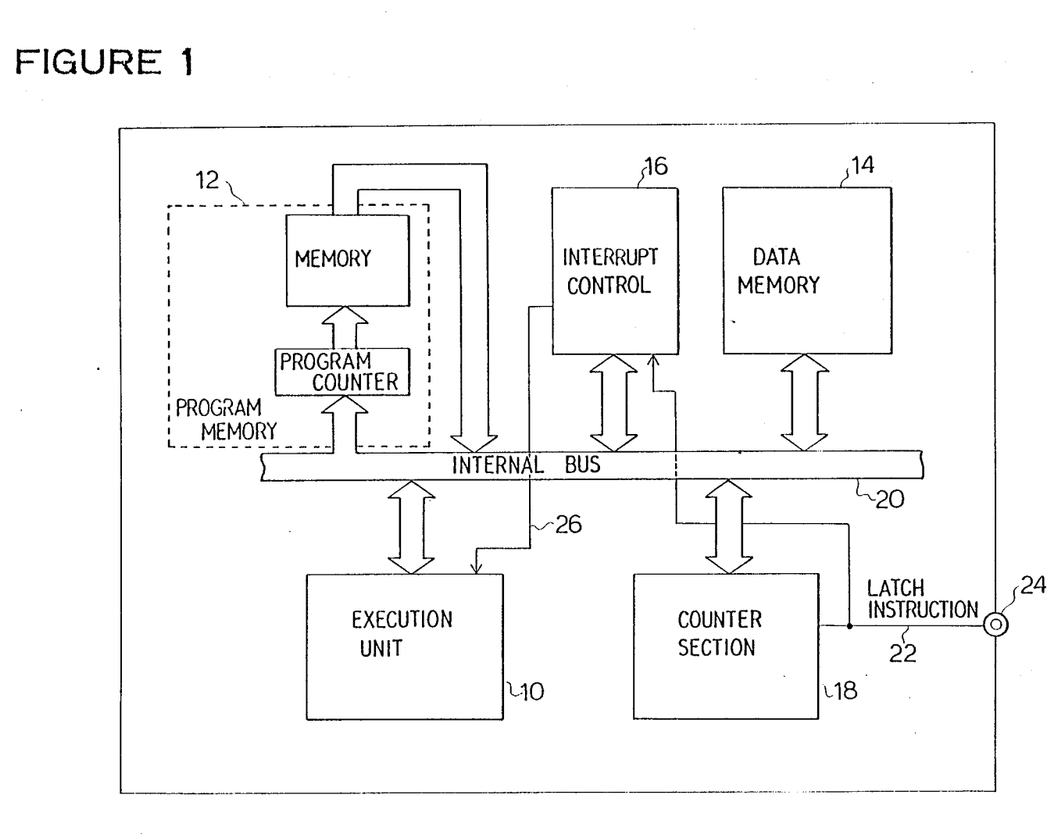
FIG. 1 is a block diagram showing an overall structure of one example of a data processor to which the present invention is applicable.

Referring to FIG. 1 there is shown an overall structure of one example of a data processor to which the present invention is applicable. The shown data processor includes an execution unit 10, a program memory 12, a data memory 14, an interrupt controller 16 and a counter section 18 which are coupled to an internal bus 20 as shown. The program memory 12 is for example composed of a memory such as a read only memory for storing necessary programs and an associated program counter for indicating a program to be read out. The data memory 14 is for example composed of a random access memory.

The execution unit 10 reads an instruction code from the program memory 12 designated by the associated program counter and then executes the read-out instruction. Further, the execution unit 10 stores the result of the processing into the data memory 14. The interrupt controller 16 receives a latch instruction signal 22 supplied through a terminal 24 from an external, which signal 22 is also supplied to the counter section 18. In response to the signal 22, the interrupt controller 16 generates an active interrupt request signal 26 to the execution unit 10. If the execution unit 10 detects that the interrupt signal 26 has become active, the execution unit 10 starts the interrupt operation.

Figure 2:
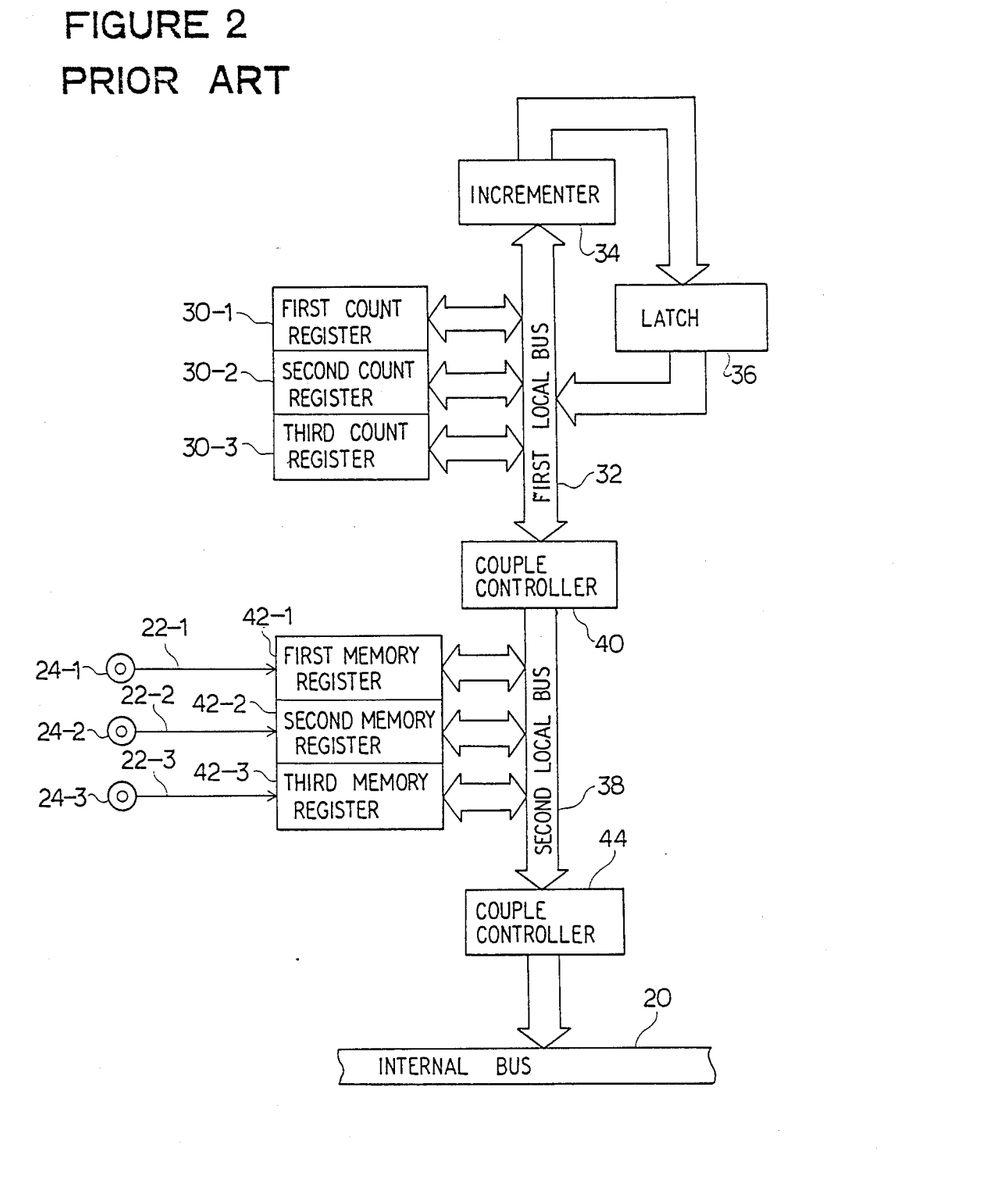
FIG. 2 is a block diagram showing a structure of a counter section in one example of a conventional data processor.

Turning to FIG. 2, there is shown a block diagram showing one example of an internal structure of the counter section 18 in the case of a conventional data processor. The shown counter section 18 includes three count registers 30-i (i=1,2,3) coupled to a local bus 32, respectively. This local bus 32 is coupled to an input of an incrementer 34, whose output is connected to an input of a latch 36. This latch 36 has an output connected to the local bus 32. The local bus 32 is also coupled to another local bus 38 through a couple controller 40, which controls a coupling between the first local bus 32 and the second local bus 38. To the second local bus 38, three memory registers 42-i (i=1,2,3) are coupled which receive latch instruction signals 22-i (i=1,2,3), respectively. The second local bus 38 is also coupled to the internal bus 20 through another couple controller 44, which also controls a coupling between the second local bus 38 and the internal bus 20.

Figure 3A:
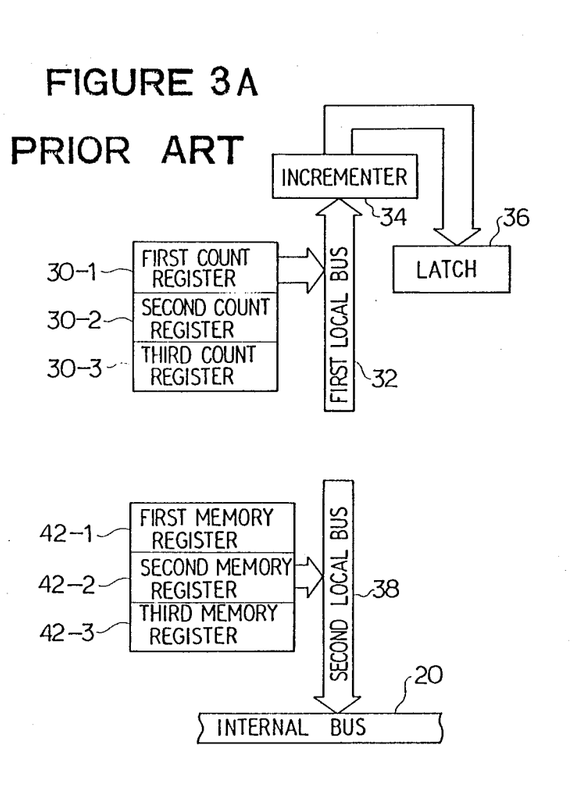
FIGS. 3A and 3B are block diagrams showing operation conditions of the counter section shown in FIG. 2, respectively.
Figure 3B:
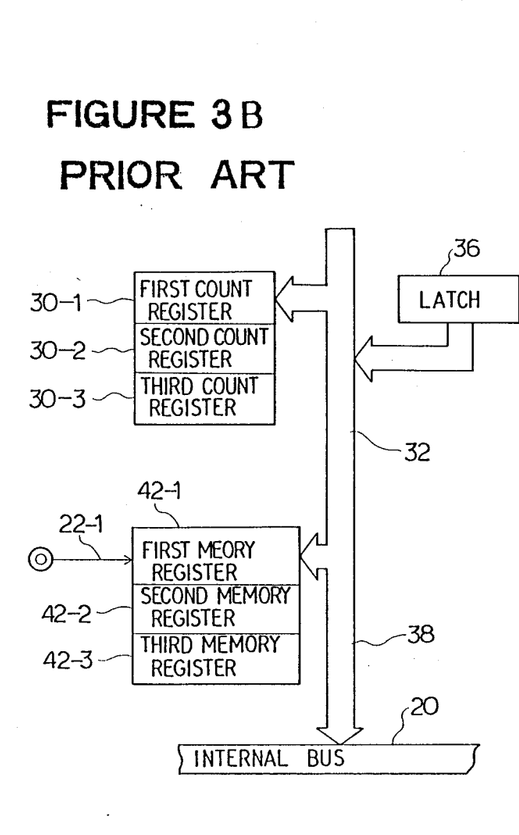

An operation of the above mentioned counter section will be explained with reference to FIGS. 3 and 4.

An count-up operation of each of the count registers 30-i is completed for two cycles T1 and T2 in response to a count-up signal having a period of the two cycles T1 and T2. In a first cycle of the count-up operation, i.e., the T1 cycle a content of the count register 30-i is outputted to the local bus 32 and the incrementer 34 counts up or increments the data outputted on the local bus 32. The result of the increment is latched in the latch 36. In this T1 cycle, the first couple controller 40 is brought into an off condition by the execution unit 10, and the second couple controller 44 is put in an on condition by the execution unit 10 so as to couple between the second local bus 44 and the internal bus 20, so that any of the memory registers 30-i can be read out through the second local bus 44 and the internal bus 20.

In a second cycle of the count-up operation, i.e., the T2 cycle, the counted-up or incremented data latched in the latch 36 is outputted onto the first local bus 32 and then fetched or written back to the corresponding count register 30-i. With this, the count-up or increment operation of the count register 30-i is completed.

Figure 9:
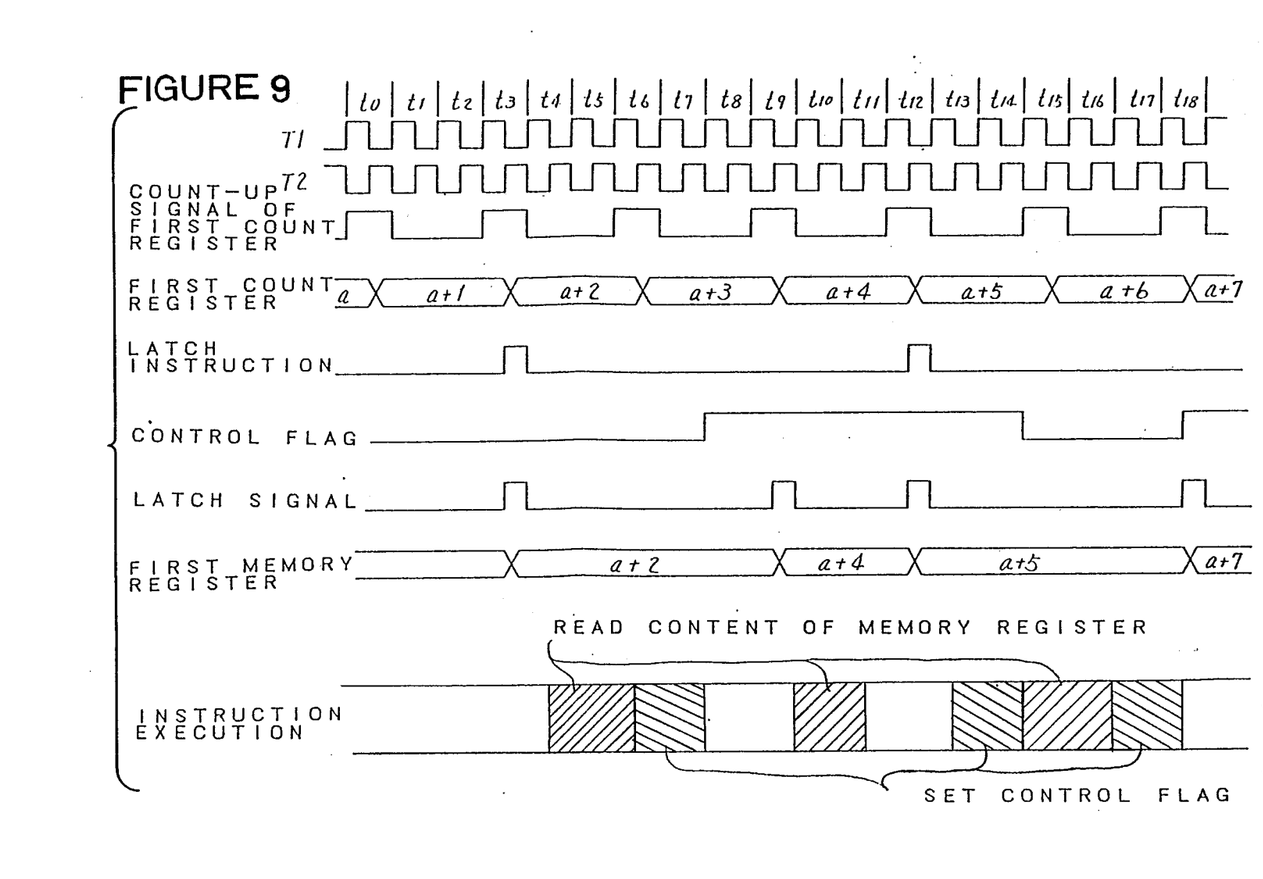
FIG. 9 is a time chart illustrating the operation of the data processor in accordance with the second embodiment of the present invention.

Further, in the T2 cycle, the local bus 32 is coupled through the couple controller 40 to the second local bus 38 so that the counted-up data is also outputted to the second local bus 38. At this time, for example as shown in FIG. 9, if an active latch signal 22-1 is supplied to the memory register 42-1 through the terminal 24-1 from the external of the data processor, the memory register 42-1 latches the data on the second local bus 38, as also shown in FIG. 9, so that the memory register 42-1 will maintain the latched data until a next latch instruction signal is inputted.

In addition, in the T2 cycle, the execution unit 10 controls the second couple controller 44 to cause it to couple the second local bus 38 and the internal bus 20. With this, the execution unit can read or fetch the data on the second local bus 38. Thus, the execution unit 10 can execute a read operation of the content of the count register 30-i by fetching the data on the second local bus 38.

Thus, in the two cycles of T1 and T2, the count-up or increment operation of one count register 30-i and the storing operation of the corresponding memory register 42-i have been completed. In a next T2 cycle, the count-up operation for another count register will be started. In this manner, the above mentioned count-up operation and the storing operation will be sequentially and cyclically executed for each of the count registers 30-i and the memory registers 42i *on the time division basis as shown in FIG. 4.*

Figure 4:
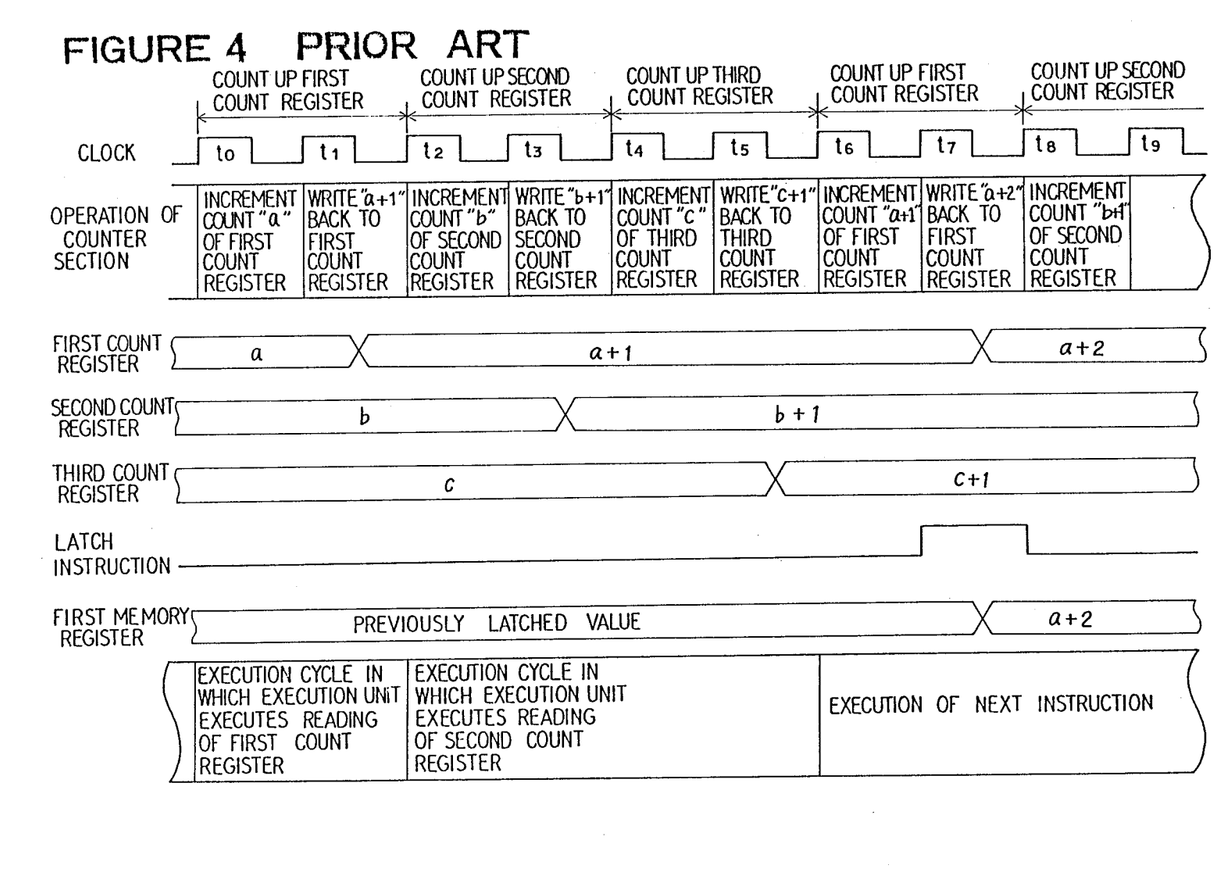
FIG. 4 is a time chart illustrating the operation of the conventional data processor explained with reference to FIG. 2.

As seen from FIG. 4, however, the conventional data processor is disadvantageous in that when the execution unit 10 tries to execute an instruction of reading out the content (i.e., the count value) of an (i)th count register, the execution unit has to wait the execution of the instruction until it comes to the T2 cycle for the (i)th count register to be read out. For example, in the time chart shown in FIG. 4, the execution unit 10 tries to read the first count register 30-1 at a cycle $t_0$, the execution unit cannot read the data of the first count register until the a cycle $t_1$. In addition, the execution unit 10 tries to execute a reading operation of a second count register 30-2 at a cycle $t_2$, the execution unit must wait until a cycle $t_5$.

As mentioned above, two disadvantages have been encountered when the conventional data processor is used in a system that the count registers must be frequently read out. Namely, a first disadvantage is a drop of the instruction processing efficiency. A second disadvantage is that it is difficult to calculate or estimate the time of instruction execution, because the execution processing speed is greatly varied upon the count-up operation condition of the counter section when the instruction is generated, even in the case of execution of the same count register reading instructions.

Figure 5:
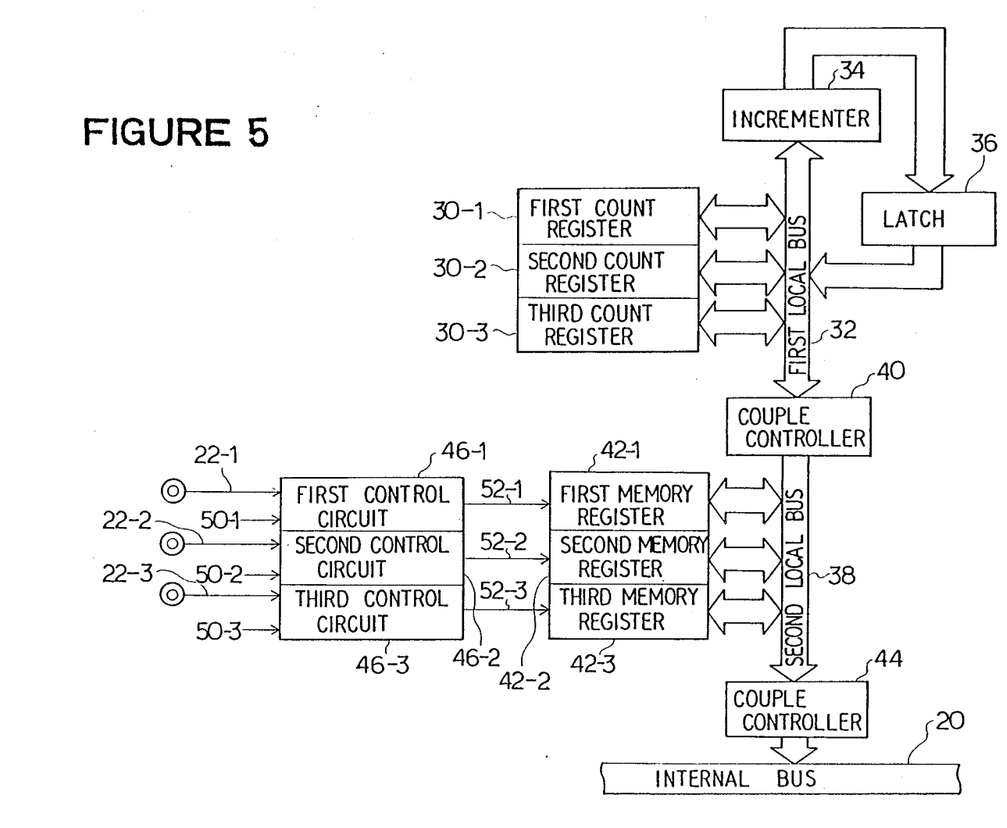
FIG. 5 is a block diagram showing a structure of a counter section of a first embodiment of a data processor in accordance with the present invention.

Referring now to FIG. 5, there is shown a block diagram showing a structure of a counter section in a first embodiment of a data processor in accordance with the present invention. In FIG. 5, circuit elements similar to those shown in FIG. 2 are given the same Reference Numerals and explanation thereof will be omitted.

As will apparent from comparison between FIGS. 2 and 5, the counter section shown in FIG. 5 has three control circuits 46-i (i=1,2,3) associated to the three memory registers 42-i, respectively. Each of the control circuits 46-i is connected to receive the latch instruction signal 22-i and a memory register read signal 50-i (i-1,2,3) from the execution unit, and generates a latch signal 52-i (i=1,2,3) to the corresponding memory register 42=i.

Figure 6:
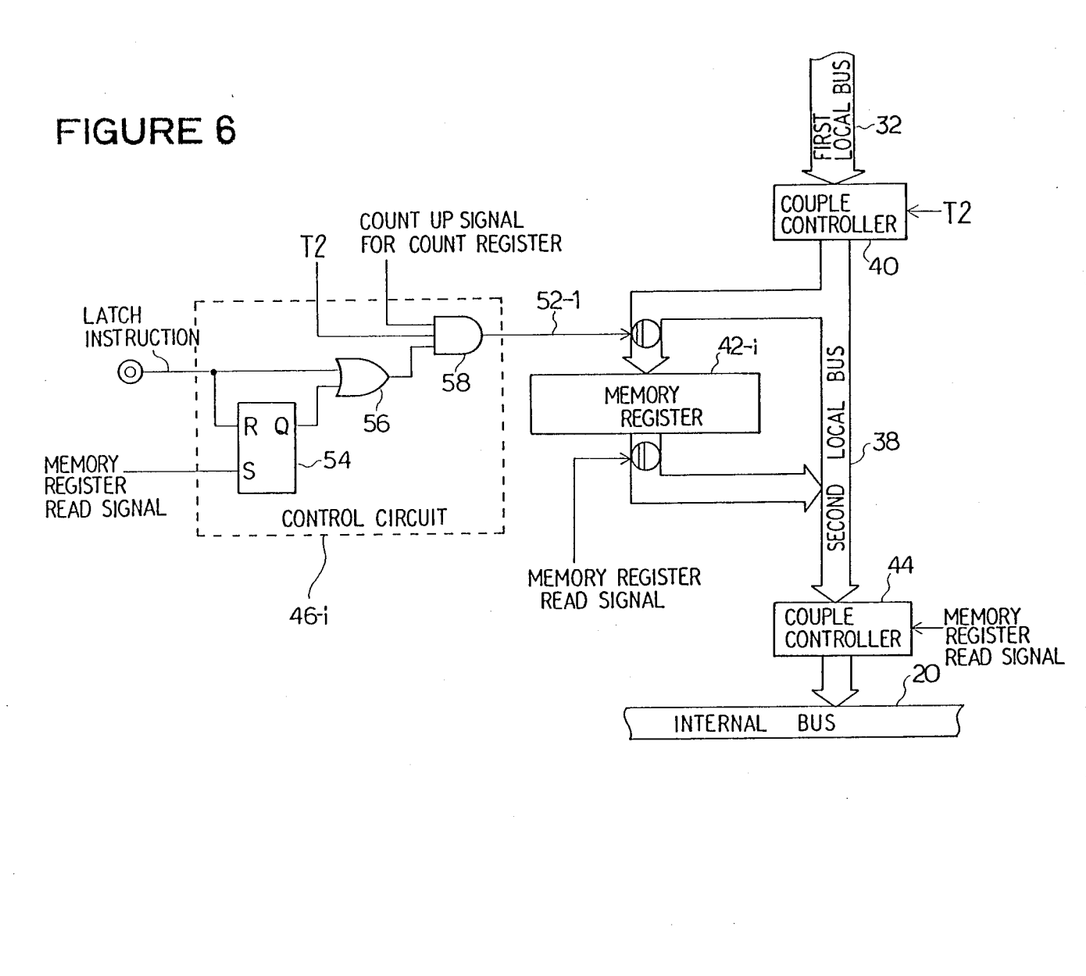
FIG. 6 is a block diagram showing a detailed structure of a memory register and an associated control circuit provided in the counter in accordance with the first embodiment of the present invention.

Turning to FIG. 6, there is a block diagram showing a detailed structure of one memory register and associated control circuit provided in the counter in accordance with the first embodiment of the present invention. The control circuit 46-i has a reset-set flipflop 54 having a set input S connected to receive the memory register read signal 50-i and a reset input R connected to receive the latch instruction signal 22-i. A Q output of the flipflop 54 is connected to one input of an OR circuit 56, whose other input is connected to directly receive the latch instruction signal 22-i. An output of the OR circuit 56 is connected to one input of an AND circuit 58, which further has two inputs connected to receive the T2 cycle signal and a count-up signal of the corresponding count register 30-i. This AND circuit 58 generates the above mentioned latch signal 52-i, which is supplied to a gate provided in an input port of the associated memory register 42-i. Another gate provided in an output port of the memory register 42-i is controlled by the memory register read signal 50-i.

A count-up operation of the counter section shown in FIG. 5 is carried out at a timing and in a manner similar to those in the counter section shown in FIG. 2, except that the latch operations of the memory registers are controlled by the latch signal generated by the associated control circuits. Namely, in the conventional data processor, the memory registers 42-i fetches the data of the associated count registers 30-i only when the latch instruction signal 22-i is rendered active, and on the other hand, in the embodiment shown in FIG. 5, the fetching operation of the memory registers 42-i is controlled by the latch signals 52-i generated by the associated control circuits 46-i.

Figure 7:
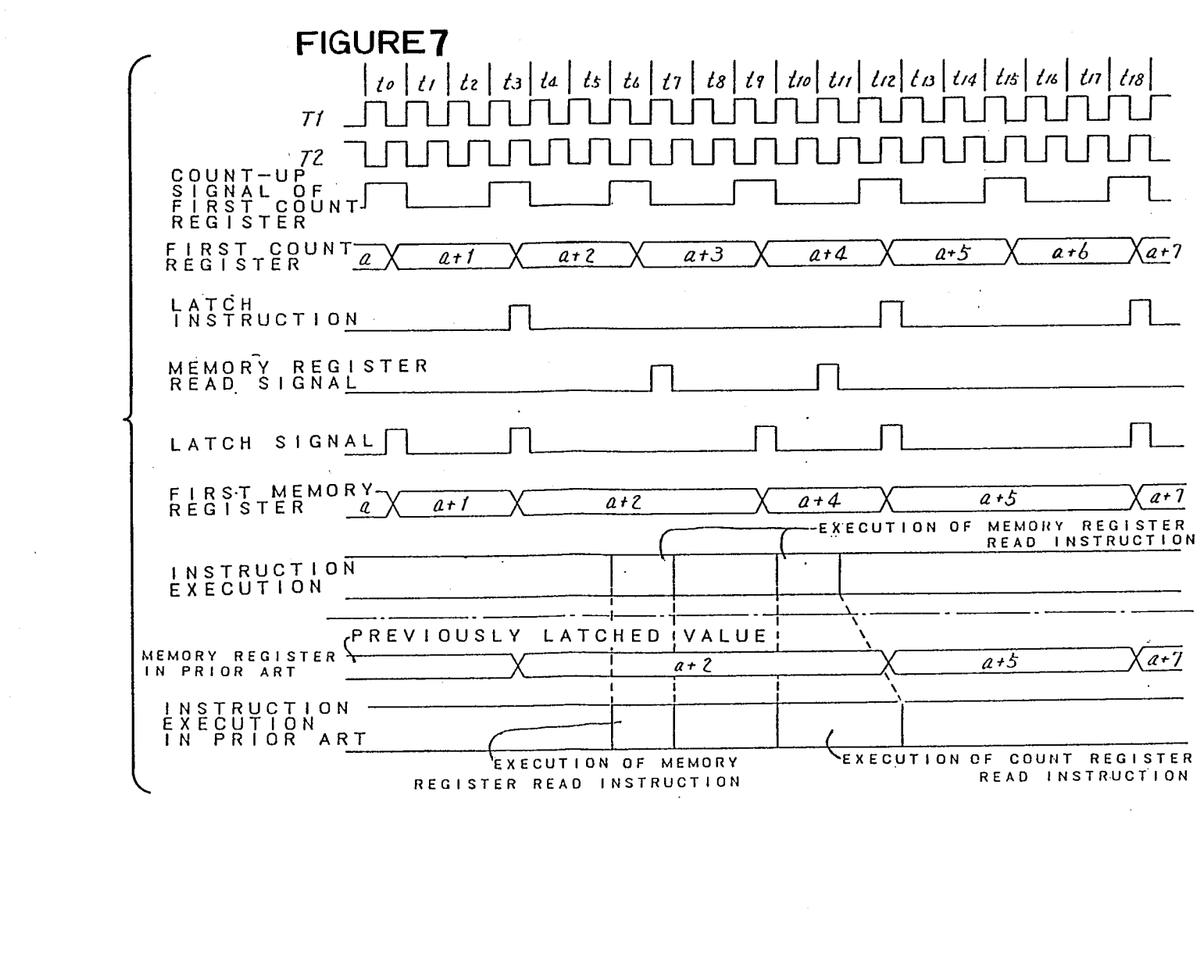
FIG. 7 is a time chart illustrating the operation of the data processor in accordance with the first embodiment of the present invention.

A more specific explanation will be made on the operation of the counter section shown on FIGS. 5 and 6 with reference to FIG. 7 illustrating a time chart of the operation of the data processor.

Assuming that the content of the first count register 30-1 at a timing $t_0$ is "a", the content of the first count register 30-1 is counted up or incremented at a timing $t_{3x}$ (x=0,1,2,...). If the latch instruction signal 22-1 is rendered active at a timing $t_3$, the latch signal 52-1 is also rendered active at the T2 cycle in the same timing $t_3$. As a result, the counted-up data "a+2" for the first count register 30-1 is latched in the first count register 30-1 and at the same time, it is also latched in the first memory register 42-1. Further, the latch instruction signal 22-1 resets the flipflop 54 so that the Q output of the flipflop 54 is brought into a low level. Accordingly, the latch signal 52-1 for the first memory register 42-1 is not generated at a next timing $t_{3x}=t_6$ so that the memory register 42-1 maintains the data "∓a+2" latched at the latch instruction signal 22-1 during the period of the timing $t_3$. On the other hand, in response to the latch instruction signal 22-1 generated at the timing $t_3$, the interrupt controller 16 generates an interrupt request signal 26 to the execution unit 10, and the execution unit 10 responds to the interrupt request signal 26 to start the interrupt operation. Thus, the execution unit 10 reads the data stored in the first memory register 42-1. At the same time, the memory register read signal 50-1 is rendered active, and therefore, the flipflop 54 is set to have the Q output of a high level.

Thereafter, until the latch instruction signal 22-1 is rendered active again at a timing $t_{12}$, the latch signal 52-1 is generated each time the count-up signal for the first count register 42-1 is generated. As one example of this case, the timing $t_9$ can be shown. After the latch instruction signal 22-1 is made active and the data is latched in the first memory register 42-1, the first memory register 42-1 will maintain its latched data until the latch instruction signal 22-1 is rendered active again. One example of this case corresponds to the condition from timing $t_{12}$ to $t_{18}$. In this embodiment, accordingly, the memory registers have not only a function of temporarily storing the value of the associated count register when the latch instruction signal is rendered active, similarly to the conventional data processor, but also a buffer function of storing the same value as that of the count register after the content of the count register is read out by the execution unit.

A data processor having the above mentioned function is very advantageous in the following points: Namely, as the result of the fact that the memory register has a buffer function for the count register, when the execution unit tries to read the content of the count register, the same effect as reading of the count register can obtained by reading the content of the memory register, not the content of the count register. In addition, the content of the memory register can be read out at a T1 cycle for a count-up timing of any count register, in contrast to the conventional data processor in which when the execution unit tries to read out the content of the count register, the execution unit has to wait the execution of the reading until the timing the count-up signal for the count register to be read out is made active. This can be easily understood from FIG. 7 in which when the execution unit tries to read the content "a+4" of the first count register 30-1 at the timing $t_{10}$, the above mentioned embodiment can read the data "a+4" by reading the content of the first memory register 42-1 at the T1 cycle in the timing $t_{11}$, while the conventional data processor must wait the execution of the reading until the timing $t_{12}$.

Figure 8:
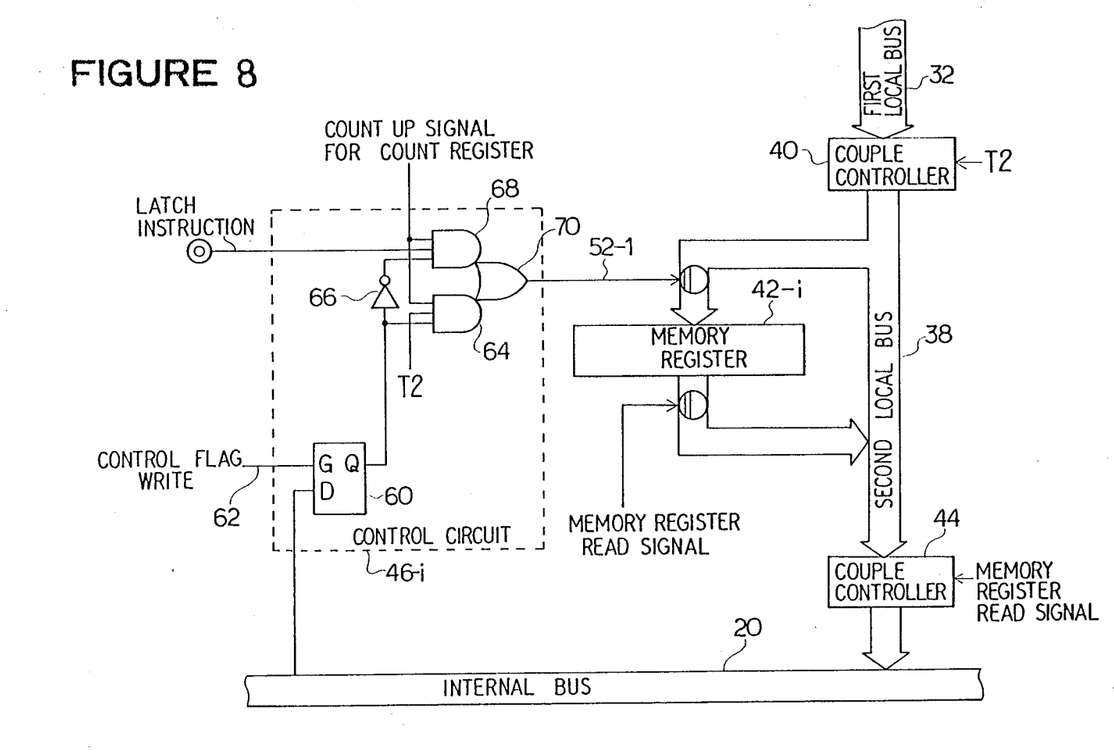
FIG. 8 is a block diagram showing a detailed structure of a memory register and an associated control circuit provided in a counter in accordance with a second embodiment of the present invention.

Turning to FIG. 8, there is a block diagram showing a detailed structure of one memory register and associated control circuit provided in the counter in accordance with a second embodiment of the present invention. The control circuit 46-i has a control flag 60 composed of a flipflop having a impact G connected to receive a control flag write signal 62 from the execution unit 10 and another input D connected to the internal bus 20. A Q output of the flipflop 60 is connected directly to one input of an AND circuit 64 and through an inverter 66 to one inut of another AND circuit 68. The AND circuit 68 is connected at its a second input to directly receive the latch instruction signal 22-i and its third input to receive a count-up signal of the corresponding count register 30-i. The AND circuit 64 has a second input connected to receive the count-up signal of the corresponding count register 30-i and a third input connected to receive the T2 cycle signal. Outputs of the two AND circuits 64 and 68 are connected to an OR circuit 70 which generates the above mentioned latch signal 52-i, which is supplied to a gate provided in an input port of the associated memory register 42-i. Another gate provided in an output port of the memory register 42-i is controlled by the memory register read signal 50-i.

As seen from FIG. 8, the control flag makes it possible to select between a first mode in which the memory register will latch the content of the count register only when the latch instruction signal is generated similarly to the conventional data processor, and a second mode in which the memory register can functions as the buffer for the count register.

A count-up register of the counter section shown in FIG. 8 is carried out at a timing and in a manner similar to the first embodiment, and therefore a derailed description thereof will be omitted, excepting the control circuit associated to the memory register.

An explanation will be made on the operation of the counter section shown on FIG. 8 with reference to FIG. 9 illustrating a time chart of the operation of the data processor.

Assuming that the content of the first count register 30-1 at a timing $t_0$ is "a", the content of the first count register 30-1 is counted up or incremented at a timing $t_{3x}$ (x=0,1,2,...). Also assume that the control flag 60 is in a reset condition at the timing $t_0$. If the latch instruction signal 22-1 is rendered active at a timing $t_3$, the latch signal 52-1 is also rendered active at the T2 cycle in the same timing $t_3$, since the flag 60 is in the reset condition. Therefore, the counted-up data "a=2" for the first count register 30-1 is latched in the first count register 30-1. In response to the latch instruction signal 22-1, the interrupt controller 16 generates the interrupt request signal 26 and the execution unit 10 starts the interrupt operation. In a program of the interrupt processing, the execution unit 10 reads the content of the memory register 42-1, and thereafter, executes an instruction for setting the control flag 60. As a result of the execution of this instruction, the memory register 42-1 will start to function as the buffer for the count register 30-1. Therefore, at the timing $t_9$, the memory register 42-1 will latch the counted-up data of the count register 20-1. Namely, during a period in which the control flag 60 is set, the reading of the memory register means the reading of the count register.

Thereafter, at a timing $t_{12}$, the latch instruction signal 22-1 is rendered active again. At this time, the execution unit 10 resets the control flag 60 in the course of the interrupt processing operating started by the latch instruction signal, so that the memory register 42-1 stops the buffer function for the count register 30-1. Then, the content of the memory register 42-1 is read out. This means the reading of the content of the count register when the latch instruction signal is generated. Thereafter, the execution unit 10 sets the control flag again in accordance with a program, so that the memory register 42-1 functions as the buffer for the first count register 30-1 again.

As seen from the above explanation, in the second embodiment, the memory register has the function as the buffer for the count register, similarly to the first embodiment. However, the execution unit can freely alternatively select, by setting and resetting of the control flag, the inherent function of the memory register in which the memory register will latch the content of the count register only when the latch instruction signal is generated similarly to the conventional data processor, and the buffer function in which the memory register can functions as the buffer for the count register. In addition, in the latter case, the data processor ensures a high instruction execution speed by reading the content of the memory register functioning as the buffer of the count register, similarly to the first embodiment.

As will be apparent from the above mentioned embodiment, the data processor in accordance with the present invention has a high instruction execution efficiency with a small amount of additional circuits for controlling the storing operation of the memory registers which temporarily store the content of the count registers, so that the memory registers can function as a buffer for the count registers. This advantage is very effective in a control system in which the value of the count registers must be frequently read out.

In the above mentioned embodiments, there have been provided the three count registers and the corresponding number of memory registers. However, the number of the count registers and the number of the memory registers can be freely selected. The larger the number of the count registers becomes, the longer the interval of the count-up operation for each count register based on the time division basis becomes. In the conventional data processors, therefore, the execution cycle of the instruction for reading the count register has become longer if the number of the count registers is increased. However, in the data processor in accordance with the present invention, the data can be read out independently of the count-up interval of each count register, and therefore, the larger the number of count registers becomes, the more remarkable the advantage of the present invention becomes.

The invention has thus been shown and described with reference to the specific embodiments. However, it should be noted that the present invention is in no way limited to the details of the illustrated structures but changes and modifications may be made within the scope of the appended claims.

I claim:

1. A data processing comprising:
    memory means for storing programs and various data;
    execution means coupled to the memory means to execute processing based upon the programs stored in the memory means;
    a plurality of counter means carrying out a count operation at a predetermined interval of time, respectively, each of the counter means being composed of a count register being incremented by an incrementing means at each corresponding count-up operation cycle;
    a corresponding number of memory register means for temporarily storing a content of the corresponding counter means, respectively; and
    control means operative in response to a latch instruction signal supplied from an external device so as to output a latch signal to a corresponding memory register means thereby to cause the corresponding memory register means to store an incremented data when the count register of the corresponding counter means is incremented by the incrementing means, the control means also responding to a memory register read signal from the execution means so as to output the latch signal to the corresponding memory register thereby to cause the corresponding memory register means to store the incremented data at each time when the count register of the corresponding counter means is incremented by the incrementing means.

2. A data processor claimed in claim 2 wherein the incrementing means includes an incrementer coupled commonly to the counter registers so as to receive a content of one selected count register and output an incremented data to a latch in a first half of a count-up operation cycle, the latch operating to write the latched data to the selected count register in a second half of the count-up operation cycle so that the content of each count register is sequentially and cyclicly counted up at each corresponding count-up operation cycle.

3. A data processor claimed in claim 2 wherein each counter register is coupled to a first local bus, and the incrementer is coupled to the first local bus to receive a content of the count register for generating an incremented data in the first half of the count-up operation cycle, and the latch is coupled to the incrementer to latch the incremented data and also coupled to the first local bus to write the latched data to the count register through the first local bus in the second half of the count-up operation cycle, the count registers being sequentially and cyclicly counted up by the cooperation of the incrementer and the latch at predetermine intervals of time.

4. A data processor claimed in claim 3 wherein the memory register means are coupled to a second local bus which is coupled through a first couple controller to the first local bus and through a second couple controller to an internal bus couple with at least the execution means, the first coupled controller operating to isolate the first local bus from the second local bus in the first half of the count-up operation cycle and to couple the first local bus to the second local bus in the second half of the count-up operation cycle.

5. A data processor claimed in claim 4 wherein the control means operates to cause the memory register means to latch the content of the corresponding counter means in response to the latch instruction signal for the memory register means and to hold the latched data until the control means receives the memory register read signal for the memory register means.

6. A data processor claimed in claim 5 wherein the control means has a reset-set flipflop having a set input connected to receive the memory register read signal and a reset input connected to receive the latch instruction signal, an OR circuit having a first input connected to a Q output of the flipflop and a second input connected to directly receive the latch instruction signal, and an AND circuit having a first input connected to receive an output of the OR circuit and second and third inputs connected to receive a signal indicative of the second half of the count-up operation cycle and a count-up signal of the corresponding count register so that the AND circuit generates a latch signal to the associated memory register means.

7. A data processor claimed in claim 4 wherein the control means responds to a control flag write signal supplied from the execution means to alternatively put the associated memory register either in a first mode in which the memory register means latches the content of the count register only when the latch instruction signal is generated or in a second mode in which the memory register functions as a temporary buffer memory for the count register for holding the content of the count register.

8. A data processor claimed in claim 7 wherein the control means has a control flag set by the control flag write signal sent from the execution unit, a first AND circuit having a first input connected to directly receive an output of the control flag, a second input connected to receive the count-up signal of the corresponding count register and a third input connected to receive a signal indicative of the second half of the count-up operation cycle, a second AND circuit having a first input connected to receive the output of the control flag through an invertor, a second input connected to directly receive the count-up signal of the corresponding count register, and an OR circuit connected to outputs of the two AND circuits to generate a latch signal to the associated memory register means.

9. A data processor comprising:
memory means for storing programs and data;
execution means coupled to the memory means to execute processing based upon the programs stored in the memory means;
a plurality of count registers;
an incrementer coupled commonly to the count registers so as to sequentially selectively receive a content of one count register and to generate an incremented data in a first half of each count-up operation cycle;
a latch coupled to the incrementer so as to latch the incremented data in the first half of the count-up operation cycle, the latch being connected to the count registers so that in a second half of the count-up operation cycle the latched incremented data is written to the corresponding count register whose content was read out to the incrementer in the first half of the count-up operation cycle, so that the content of each count register is counted up at each corresponding count-up operation cycle;
a corresponding number of memory registers each for temporarily storing a content of a corresponding count register; and
a corresponding number of control circuits provided for the memory registers in a one-to-one relation, each of the control circuits responding to a latch instruction signal supplied from an external device so as to output a latch signal to a corresponding memory register thereby to cause the corresponding memory register to store the latched data when the latched data is written to the corresponding count register and hold the stored data until the control circuit receives a memory register read signal from the execution means, the control circuit also responding to the memory register read signal from the execution means so as to output the latch signal to the corresponding memory register thereby to cause the corresponding memory register to store and hold the latched data at each time when the latched data is written to the count register of the corresponding count register.

10. A data processor claimed in claim 9 wherein each control circuit has a reset-set flipflop having a set input connected to receive the memory register read signal and a reset input connected to receive the latch instruction signal, an OR circuit having a first input connected to a Q output of the flipflop and a second input connected to directly receive the output of the flipflop and a third input connected to directly receive the latch instruction signal, and an AND circuit having a first input connected to receive an output of the OR circuit and second and third inputs connected to receive a signal indicative of the second half of the count-up operation cycle and a count-up signal of the corresponding count register so that he AND circuit generates a latch signal for the corresponding memory register.

11. A data processor comprising:
memory means for sorting programs and data;
execution means coupled to the memory means to execute processing based upon the programs stored in the memory means;
a plurality of count registers;
an incrementer coupled commonly to the count registers so as to sequentially selectively receive a content of one count register and to generate an incremented data in a first half of each count-up operation cycle;
a latch coupled to the incrementer so as to latch the incremented data in the first half of a count-up operation cycle, the latch being connected to the count registers so that in a second half of the count-up operation cycle the latched incremented data is written to corresponding count register whose content was read out to the incrementer in the first half of the count-up operation cycle, so that the content of each count register is counted up at each corresponding count-up operation cycle;
a corresponding number of memory registers each for temporarily storing a content of a corresponding count register; and
a corresponding number of control circuits provided for the memory registers in a one-to-one relationship, each of the control circuits responding to a control flag write signal supplied from the execution means to be alternatively put either in a first mode or in a second mode, each control circuit operating in the first mode to respond to a latch instruction signal supplied from an external device so as to output a latch signal to a corresponding memory register thereby to cause the corresponding memory register to store the latched data only when the latched data is written to the corresponding count register and hold the stored data until the control circuit is put in the second mode or until the control circuit receives a next latch instruction signal, each control circuit operating in the second mode so as to output the latched signal to the corresponding memory register at each time when the latched data is written to count register of the corresponding count register, thereby to cause the corresponding memory register to store and hold the latched data so that the memory register functions as a temporary buffer memory for the count register for holding the content of the corresponding count register.

12. A data processor claimed in claim 11 wherein each control circuit includes:
- a control flag set by the control flag write signal from the execution unit;
- a first AND circuit having a first input connected to directly receive an output of the control flag, a second input connected to receive the count-up signal of the corresponding count register and a third input connected to receive a signal indicative of the second half of the count-up operation cycle;
- a second AND circuit having a first input connected to receive the output of the control flag through an invertor, a second input connected to directly receive the latch instruction signal and a third input connected to receive the count-up signal of the corresponding count register; and
- an OR circuit connected to outputs of the two AND circuits to generate a latch signal to the corresponding memory register.

* * * * *